United States Patent Office

3,741,874
Patented June 26, 1973

3,741,874
METHOD OF PREPARING IMPROVED SELECTIVE CULTURE MEDIUM
Lenore Gordon, 10 Reading St., Ramat Aviv, Tel Aviv, Israel
No Drawing. Filed Jan. 20, 1972, Ser. No. 219,571
Int. Cl. C12k 1/10
U.S. Cl. 195—102                                10 Claims

ABSTRACT OF THE DISCLOSURE

An improved culture medium which is selective for the growth, isolation and identification of *Hemophelius influenzae* bacteria is prepared by combining conventional culture medium ingredients with red blood cells under temperature conditions which release but do not destroy the X and V factors present in the blood cells, thereby making them available as nutrients in the culture medium.

---

This invention relates to a novel method of preparing a culture medium for the growth of micro-organisms. More particularly, this invention is concerned with the preparation of an improved medium for the selective growth, isolation and identification of *Hemophelius influenzae* bacteria.

*Hemophelius influenzae* is a well-known organism which is associated with diseases affecting human beings, such as pneumonia, meningitis, sinusitis and eye infections. All of these diseases can be successfully treated with antibiotics if discovered in time. However, due to the fastidious nature of the *Hemophelius influenzae* organism, it has been found that commercially available culture media are inadequate for the isolation and detection of this strain. A need has existed for an enriched culture medium which is selective for the growth of *Hemophelius influenzae* and which will enable the early isolation and detection of this organism.

It is an object of the present invention to provide a novel and improved culture medium which is selective for the growth and isolation of *Hemophelius influenzae* bacteria.

It is another object of this invention to provide a novel method for the preparation of a culture medium which is selective for the growth and isolation of *Hemophelius influenzae* bacteria.

Yet another object of this invention is to provide a novel method for the preparation of a culture medium which is selective for the growth and isolation of *Hemophelius influenzae* bacteria.

The above and other objects of the invention are accomplished by the preparation of an enriched culture medium comprising a base medium comprising a solidifying agent and at least one conventional nutrient and red blood cells which has been processed under carefully controlled conditions. It has now been discovered that when these ingredients are combined under controlled temperature conditions, it is possible to make available both the X-factor and the V-factor present in the blood cells as a nutrient for the rapid and selective growth of large *Hemophelius influenzae* colonies which may be easily isolated and identified. The terms "X-factor" and "V-factor" as used herein are generally used by those persons skilled in the art to define respectively a heat stable growth promoting derivative of hemoglobin or hemin and a thermolabile substance found in yeast, some bacteria, plant extracts and blood. Both of these substances are known nutrients for *Hemophelius influenzae* bacteria.

The type of red blood cells employed in the preparation of the improved medium is not critical and either fresh or outdated human red blood cells may be used. Preferably, the blood cells will be citrated or otherwise treated so as to prevent any clotting which could interfere with culture growth. For example, thromboliquine heparinum, nitrium oxalate, ethylene diamine tetra-acetic acid or other anti-clotting agents may be employed. The optimum medium color and growth rates are obtained when the red blood cells comprise 2.0 to 7.0 volume percent of the culture medium, preferably 5.0 to 5.5 vol. percent, although somewhat larger or smaller amounts may be employed if desired.

The medium of the invention may also include conventional nutrients, solidifying agents and the like of the types which are well known in the art of preparing culture mediums. Such mediums typically comprise an aqueous mixture of agar and/or gelatin as solidifying agents and one or more nutrients, e.g. meat extract, peptone, yeast extract, beef heart infusion, sodium chloride and the like. Typical well known base mediums which are useful in the preparation of the medium of the present invention are nutrient agar, blood agar and dextrose heart agar. In a preferred embodiment the base medium will comprise an aqueous solution including 2% agar, 5% gelatin, 1% yeast extract and minor amounts of beef heart infusion, bacto-peptone and sodium chloride. It will be understood by those persons skilled in the art that the amounts and types of materials employed to form the base medium are not critical and wide variations may be made without adversely affecting the effectiveness of the medium.

In the preparation of the improved culture medium of the invention, whole red blood cells are sterilely added to the agar or other combination of conventional medium components, without mixing or agitation and the combination of ingredients is subjected to heat under conditions which result in the creation of at least two distinct temperature zones in the flask or other container which holds the materials. The application of heat to the combination of materials is continued for a time sufficient to form two distinct layers from the combined ingredients, an upper layer comprising the improved culture medium of the invention and a lower sediment layer. After termination of the heating step and cooling to room temperature, the uppermost layer is removed and employed in a conventional fashion as a culture medium for the detection and isolation of *Hemophelius influenzae*. By proper control of the heating step, as will be described more fully hereinafter, the resulting medium will be brown in color thereby providing good contrast with the typical gray color of the Hemophelius colony so as to facilitate detection.

The control of temperature both during the period when the ingredients used to form the medium are being combined and during the heating stage, as described above, are critical features of the invention. It has not heretofore been thought possible to subject red blood cells to a temperature sufficient to burst the cells and make available the X- and V-factors without simultaneously destroying the thermolabile V-factor. It has now been discovered, however, that by carrying out the heating step under conditions whereby the temperature in the lower portion of the container holding the ingredients is maintained at a level sufficient to burst the red blood cells while simultaneously maintaining the temperature in the upper portion of the container at a temperature below the temperature required to destroy the V-factor, a culture medium containing both the X-factor and the V-factor may be prepared. While not wishing to be limited to any particular theory, it is presently believed that the X- and V-factors rise to the top of the container holding the agar-red blood cell mixture as it is formed and by maintaining the upper portion of this combination of ingredients at a temperature below the instability temperature of the V-factor, the factor is not destroyed.

In the typical procedure for preparing the improved culture medium of the invention, the differential temperature zones are established and maintained by bringing the agar or other solidifying agent or combination of solidifying agents and nutrients to a temperature in the range of approximately 75° to 85° C., adding a sufficient amount of cold red blood cells thereto to drop the temperature of the combination of ingredients to approximately 60° to 75° C. and thereafter, heating the container which holds the combination of ingredients in a small amount of boiling water which is maintained by a low flame, such that only a portion of the container is in contact with the water. Numerous other differential heating techniques will readily occur to those persons skilled in the art. Irrespective of the particular technique which is selected, the temperature in the upper portion of the container will be maintained at a temperature below approximately 70° C. preferably in the range of 59° to 69° C., a temperature which will not adversely affect the V-factor. The temperature in the lower portion of the container will exceed approximately 70° C., the approximate temperature required to burst said red blood cells but below approximately 80° C., so that the V-factor will not be immediately destroyed upon its release due to excessive exposure to the elevated temperature. Ordinarily, heating will be continued for a period of approximately 45 to 90 minutes, e.g., 60 minutes. It will be understood by those persons skilled in the art that although the temperatures and heating time set forth above are critical if the optimum medium color and culture growth rates are desired, the heating and temperature conditions are not subject to exact definition or measurement and some variation in temperature and heating time may be made while still obtaining a functional, albeit non-optimum medium.

The addition of the whole red blood cells and the application of heat will result in the formation of two distinct layers, i.e., a lower layer comprising blood sediment and an upper layer comprising the culture medium of the invention. Subsequent to the heating step, the combination of ingredients is cooled to room temperature and the upper portion thereof may thereupon be poured off onto conventional culture plates for immediate use. Alternatively, the upper portion of the combination of ingredients may be separated from the remaining portion and packaged and stored under refrigeration for use at a later time.

The invention will be further understood by reference to the following illustrative examples:

EXAMPLE I 500 cc. of nutrient agar was heated in an autoclave and left standing at room temperature until it cooled to a temperature of 80° C. Thereafter, 25 cc. of citrated, outdated human cold, red blood cells were added to the hot nutrient agar without mixing the two ingredients together. The temperature of the combination of ingredients fell to about 70° C.

The flask containing the combination of nutrient agar and red blood cells was placed in a pot containing a small amount of water boiling under a small flame. After a short time, the temperature in the upper part of the flask was measured and determined to be 63° C.; the temperature in the lower portion of the flask was 78° C. The flask containing the ingredients was permitted to stand in the boiling water for 60 minutes and was thereafter removed from the heat source and left standing at room temperature until it was cool enough to pour by hand.

The upper portion of the mixture in the flask which was a brownish color was poured thickly into sterile plastic Petri dishes which were then inoculated in the usual manner and incubated in a candle jar. Within 7 to 9 hours subsequent to inoculation, small gray colonies of Hemophelius influenzae were visible, and within 13 to 15 hours large colonies appeared which were readily identifiable. By comparison, plates containing conventional chocolate agar, the medium presently recommended for growth of Hemophelius influenzae, produced only very small colonies after incubation periods of 24 to 48 hours.

EXAMPLE II

In a series of experiments, the procedure of Example I was repeated utilizing nutrient agar which had been preheated to 65°, 70°, 75°, 85°, 90°, 95° and 100° respectively. In each instance, the temperature of the combination of ingredients fell approximately 11° from the original temperature of the preheated nutrient agar. Thereafter the flask containing the combination of ingredients was subjected to heat as described in Example I.

As a result of this series of experiments it was determined that the optimum preheating temperature range was 75 to 85° C. since both excellent growth characteristics and a desirable medium brown medium color was obtained within this range. While the growth characteristics of the medium were still excellent at the 90° preheating temperature, the medium color became light brown thereby making it more difficult to identify the gray Hemophelius colonies. At preheating temperatures above 90° C., the color not only continued to deteriorate, i.e., became lighter with rising temperatures but, in addition, the rate of Hemophelius growth in the medium was also reduced. At preheating temperatures below 75° C., a similar progressive deterioration in medium color and medium growth rate was also observable.

Having thus described the general nature as well as specific embodiments of the invention, the true scope will now be pointed out in the appended claims.

What is claimed is:

1. A method of preparing a culture medium which is selective for the growth of Hemophelius influenzae comprising combining human red blood cells with a base medium comprising agar and at least one nutrient, subjecting the combination of ingredients to heat under conditions whereby the lowermost portion of said combination of ingredients is maintained at a temperature sufficient to burst said bood cells and the uppermost portion of said combination of ingredients is maintained at a temperature below the temperature at which the V-factor in said blood cells is destroyed and separating the upper portion of said combination of ingredients from the remainder.

2. The method of claim 1 wherein the uppermost portion of said combination of ingredients is maintained at a temperature below approximately 70° C. and the lowermost portion of said combination of ingredients is maintained at a temperature in the range of approximately 70° to 80° C.

3. The method of claim 1 wherein cold red blood cells are added to agar which has been heated to a temperature in the range of 75° to 85° C.

4. The method of claim 3 wherein an amount of cold red blood cells is added to said agar sufficient to drop the temperature of the combination of ingredients to below about 70° C.

5. The method of claim 1 wherein said heating step is continued for approximately 45 to 90 minutes.

6. The method of claim 1 wherein said combination of ingredients comprises 2 to 7 vol. percent of said human red blood cells.

7. The method of claim 6 wherein an anti-clotting agent is present in said blood cells.

8. The method of claim 7 wherein said blood cells are citrated.

9. The method of claim 1 wherein said base medium includes gelatin, yeast extract, beef heart infusion and sodium chloride.

10. A method of preparing a culture medium which is selective for the growth of Hemophelius influenzae comprising, bringing a base medium comprising agar and at least one nutrient to a temperature in the range of approximately 75° to 85° C., combining said base medium with an amount of cold, human red blood cells sufficient to reduce the temperature of the combination of ingredients to approximately 65° to 75° C., subjecting said combination of ingredients to heat for a period of approximately 45 to 90 minutes under conditions wherein the lowermost portion of said combination is maintained at a temperature of approximately 70° to 80° C. and the uppermost portion of said combination is maintained at a temperature below 70° C. and separating the uppermost portion of said combination from said remainder.

References Cited

UNITED STATES PATENTS 3,649,460   3/1972   Controni et al. _____ 195—100

A. LOUIS MONACELL, Primary Examiner

R. J. WARDEN, Assistant Examiner

U.S. Cl. X.R.

195—100, 103.5 R

UNITED STATES PATENT OFFICE
CERTIFICATE OF CORRECTION

Patent No. 3,741,874        Dated 6/26/73

Inventor(s) GORDON, LENORE

It is certified that error appears in the above-identified patent and that said Letters Patent are hereby corrected as shown below:

On the front page, Element Identifier 72 delete the address of the Inventor and insert

--215 Passaic Avenue, Passaic, New Jersey 07055--.

Signed and sealed this 23rd day of July 1974.

(SEAL)
Attest:

McCOY M. GIBSON, JR.            C. MARSHALL DANN
Attesting Officer                 Commissioner of Patents